United States Patent
Bahl et al.

(10) Patent No.: US 7,133,664 B2
(45) Date of Patent: *Nov. 7, 2006

(54) INFORMATION MANAGEMENT AND PROCESSING IN A WIRELESS NETWORK

(75) Inventors: Paramvir Bahl, Issaquah, WA (US); Joshua G. Broch, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 85 days.

This patent is subject to a terminal disclaimer.

(21) Appl. No.: 10/973,110

(22) Filed: Oct. 25, 2004

(65) Prior Publication Data

US 2005/0085241 A1    Apr. 21, 2005

Related U.S. Application Data (63) Continuation of application No. 09/766,505, filed on Jan. 19, 2001, now Pat. No. 6,885,860.

(51) Int. Cl.
*H04M 3/42* (2006.01)
*H04M 3/493* (2006.01)
*H04Q 7/22* (2006.01)

(52) U.S. Cl. ............... 455/414.2; 455/414.1; 455/414.3; 455/456.1; 455/456.2; 455/456.3; 455/456.5; 455/456.6; 701/207; 707/100

(58) Field of Classification Search ............ 455/404.2, 455/414.1, 414.3, 422, 456.1–457; 701/207, 701/300; 707/100, 104.1, 203, 204
See application file for complete search history.

(56) References Cited

U.S. PATENT DOCUMENTS

| | | | |
|---|---|---|---|
| 5,204,670 A | 4/1993 | Stinton | |
| 5,625,668 A | 4/1997 | Loomis et al. | |
| 6,263,341 B1 | 7/2001 | Smiley | |
| 6,327,535 B1 | 12/2001 | Evans et al. | |
| 6,380,957 B1 * | 4/2002 | Banning | 715/828 |
| 6,408,307 B1 * | 6/2002 | Semple et al. | 707/104.1 |
| 6,539,381 B1 | 3/2003 | Prasad et al. | |
| 6,597,906 B1 | 7/2003 | Van Leeuwen et al. | |
| 6,766,174 B1 * | 7/2004 | Kenyon | 455/457 |
| 2002/0055924 A1 | 5/2002 | Liming | |
| 2002/0119788 A1 | 8/2002 | Parupudi et al. | |

* cited by examiner

*Primary Examiner*—Steve M. D'Agosta
(74) *Attorney, Agent, or Firm*—Lee & Hayes, PLLC (57) ABSTRACT

Methods, systems and data structure for storing and managing information in a wireless network are described wherein fixed resources in the system are stored in a database in a hierarchical directory structure according to the location of each fixed resource. Each level of the directory structure represents a geographical area in which a fixed resource is located. A mobile user submits a query for the location of the nearest fixed resource having certain properties. The system determines the location of the mobile user and then searches the database for the requested fixed resource that is nearest to the mobile user. When the fixed resource is identified, data regarding its location is transmitted to the mobile user. In addition, specific directions as to how to get to the location of the fixed resource from the location of the mobile user may be provided.

26 Claims, 4 Drawing Sheets

INFORMATION MANAGEMENT AND PROCESSING IN A WIRELESS NETWORK

RELATED APPLICATIONS

This present application claims priority under 35 U.S.C. §120 as a continuation of U.S. patent application Ser. No. 09/766,505, filed Jan. 19, 2001 now U.S. Pat. No. 6,885,860, titled "Information Management and Processing in a Wireless Network", the disclosure of which is hereby incorporated by reference in its entirety.

TECHNICAL FIELD

This invention relates to information processing and management and, more particularly, to managing and processing information in a wireless network system.

BACKGROUND OF THE INVENTION

The proliferation of lightweight, portable computing devices and high-speed wireless local area networks (LANs) has enabled users to remain connected and compute while on the move inside buildings and on campus areas around buildings. This new paradigm has given birth to a new class of applications that are "location aware." The goal of mobile computing in many instances is to enable a user to interact effectively with his or her physical surroundings. One example of such an interaction is to find a fixed network resource that is nearest to a mobile computing unit so that the user of the mobile computing unit may interact with the fixed network resource.

A key distinguishing feature of these systems is that the application information and/or interface presented to the user is, in general, a function of his or her physical location. The granularity of location information needed may vary from one application to another. For example, locating a nearby printer requires fairly coarse-grained location information whereas locating a book in a library would require fine-grained information.

One component of these systems is the actual tracking system, which determines a user's location. For example, one such system is the Global Positioning System (GPS), which provides inexpensive and portable devices that can locate and track users. Such systems currently are used to provide direction to drivers through an in-vehicle system, provide location and tracking information for marine navigation, and allow shipping companies to locate and track individual shipments. However, the GPS system relies on an unobstructed view of several satellites, making its use for tracking users who are indoors ineffective.

To overcome this obstacle, alternate technologies have been developed to locate and track users or objects in an indoor environment. One such system uses tags placed on the items that are to be tracked. In an electronic sense, the tags can be either active or passive, and they communicate with base stations. The base stations are physically linked together through a wired or wireless network. Each tag transmits a unique code to identify itself. The location of the tag can thereby be determined to be in the vicinity of the base station with which the tag last communicated.

Such tag-based tracking and location systems require a significant installation of specialized base stations. A tag-based system can only determine the location of the tags as being "near" a particular base station. As a result, a large number of base stations must be installed to achieve a sufficiently high resolution. Furthermore, obtrusive tags have to be placed on every item that is to be tracked or located, and in the case of infrared tags, the system operates only when there is a line of sight between the tag and a base station. For these reasons, tag-based systems have shown very limited success.

Another technology has been developed which uses radio frequency transmissions from base stations and mobile units to track the location of mobile units. This technology is described in U.S. patent application Ser. No. 09/513,155, entitled "Using a Derived Table of Signal Strength Data to Locate and Track a User In a Wireless Network, and in U.S. patent application Ser. No. 09/513,355, entitled "Locating and Tracking a User in a Wireless Network Through Environmentally Profiled Data."

In this system, a Wireless Local Area Network (WLAN) is utilized for locating and tracking users. A WLAN consists of base stations connected to a wired network, and mobile devices that are "connected" to the WLAN through radio frequency signals with the base stations. The signal sensing ability of both the base station and the mobile device are used to determine the location of the mobile device, and thus the location of the user of the mobile device. Specifically, the strength of the received signal from several base stations is measured by the mobile device. The mobile device then compares the signal strength from each of the base stations to a pre-computed table containing the base stations' signal strength at various known locations of the mobile device. From this comparison, the mobile device determines its location. Alternatively, the strength of the signal received from the mobile device can be measured at a number of base stations. This signal strength is then compared by a central computer to a pre-computed table containing the mobile computer's signal strength at the base stations for various known locations. From this table, the central computer determines the location of the mobile computer.

Such a system contains system resources that have a relatively fixed location. Examples of fixed network resources include, but are not limited to, access points, printers, copiers, scanners, office locations, etc. When a mobile user desires to find one such fixed resource, the user submits a query to the system for the location of such a fixed resource. The system determines the location of the user and then searches a database on a system server that contains the location and operational properties of each fixed resource. When an appropriate fixed resource is found, the information regarding the resource is returned to the user.

The classical way to store database records of fixed resources in a system server is to store the records according to a network address and/or capabilities of the fixed resource. Because such systems can be very large, there may be several hundred or thousand records in a resource database that contains information on every fixed resource in the system. The processing overhead required to process a query for the nearest fixed resource of a certain type and having certain properties can be extremely high because the search for a location as very inefficient.

SUMMARY OF THE INVENTION

Methods, systems and data structures are described in which information regarding fixed resources in a wireless network system are stored as records, or objects according to a location of each fixed resource.

A mobile user may request the location of the nearest fixed network resource having certain properties. The request, or query, is transmitted to the nearest base station and is forwarded to a system server. The system then determines the location of the mobile user. Once the system has determined the location of the mobile user, it finds the closest resource requested by the user.

To make the search for a fixed resource location much more efficient, the fixed resources are stored as objects in a hierarchical data structure, such as a directory tree, according to the location of the fixed resources. A lowest level of the directory tree corresponds to a smallest geographical region in which the fixed resource is located. Each subsequently higher level in the directory tree corresponds to an increasingly larger geographical region in which the fixed resource is located.

When a mobile user submits a query to find the nearest fixed resource having certain properties, the system begins the search in the directory tree structure at the level in which the base station receiving the request is located. For example, if a query from a mobile user searching for a printer is transmitted to a base station described as USA/Washington/Redmond/Main/Bldg112/Floor2/AP3 (access point 3), the search begins at:USA/Washington/Redmond/Main/Bldg112/Floor2. If a matching printer is not found at level Floor2, the search continues up the hierarchy to level Bldg112. If a match is not found in Bldg112, the search continues at level Main, and so on.

If the system includes more than one server, the database containing the directory tree structure is replicated on each server in the system. Therefore, no matter which server receives a query transmission from a mobile user, the search can be performed on that server. If a change is made to the database on any server, the altered database is copied to the other servers.

Additional features and advantages of the invention will be made apparent from the following detailed description of illustrative implementations, which proceeds with reference to the accompanying figures.

BRIEF DESCRIPTION OF THE DRAWINGS

A more complete understanding of the various methods and arrangements of the present invention may be had by reference to the following detailed description when taken in conjunction with the accompanying drawings, wherein.

DETAILED DESCRIPTION

The invention is illustrated in the drawings as being implemented in a suitable computing environment. Although not required, the invention will be described in the general context of computer-executable instructions, such as program modules, to be executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practice in distributed computing environments where tasks are performed by remote processing devices that are linked through a communications network. In a distributed computing environment, program modules may be located in both local and remote memory storage devices.

Figure 1:
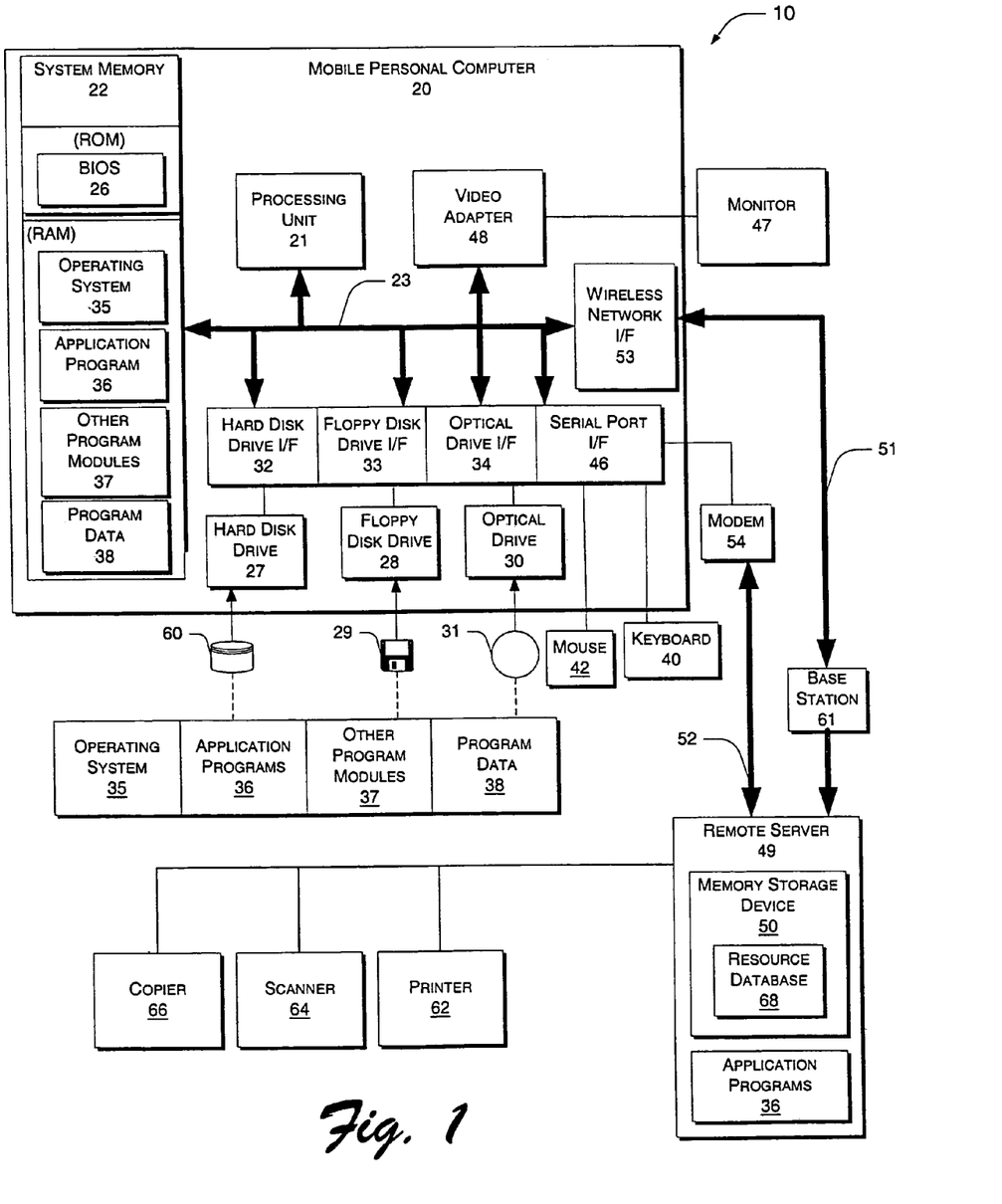
FIG. 1 is a block diagram generally illustrating an exemplary computer system on which the present invention resides.

With reference to FIG. 1, an exemplary wireless network system 10 for implementing the invention includes a general purpose computing device in the form of a conventional mobile personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the mobile personal computer 20, such as during start-up, is stored in ROM 24. The mobile personal computer 20 further includes a hard disk drive 27 for reading from and writing to a hard disk 60, a floppy disk drive 28 for reading from or writing to a removable magnetic disk 29, and an optical disk drive 30 for reading from or writing to a removable optical disk 31 such as a CD ROM or other optical media.

The hard disk drive 27, floppy disk drive 28, and optical disk drive 30 are connected to the system bus 23 by a hard disk drive interface 32, a floppy disk drive interface 33, and an optical disk driver interface 34, respectively. The drives and their associated computer-readable media provide non-volatile storage of computer-readable instructions, data structures, program modules and other data for the mobile personal computer 20. Although the exemplary environment described herein employs a hard disk 60, a removable magnetic disk 29, and a removable optical disk 31, it will be appreciated by those skilled in the art that other types of computer-readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 25, one or more application programs 36, other program modules 37, and a program data 38. A user may enter commands and information into the mobile personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such a a parallel port, game port or universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The mobile personal computer 20 may operate in a networked environment using logical connections to one or more remote computers, such as a server 49. The remote server 49 may be another type of remote computer, such as another personal computer, a router, a network PC, a peer device or other common network node, and typically includes many or all of the elements described above relative to the mobile personal computer 20, although only a memory storage device 50 has been illustrated in FIG. 1. The logical connections depicted in FIG. 1 include a Wireless Local Area Network (WLAN) 51 and a wide area network (WAN) 52. Such networking environments are commonplace in offices, enterprise-wide computer networks, intranets and the Internet.

When used in a WLAN networking environment, the mobile personal computer 20 is connected to the local network 51 through a wireless network interface or adapter 53. The wireless interface 53 transmits wireless packets to a base station 61. The base station 61 can then retransmit the packets, either through a wired or wireless network to the remote server 49. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the mobile personal computer 20, or portions thereof, may be stored in the remote memory storage device. It will be appreciated that the network connections shown are exemplary and other means of establishing a communications link between the computers may be used.

FIG. 1 also shows several fixed network resources, such as a printer 62, a scanner 64 and a copier 66. Information about the fixed resources 62, 64, 66 is contained in a resource database 68 stored in the memory storage device 50. Information contained included information regarding location of each fixed resource and properties of each fixed resource. It is noted that, while only a few fixed resources are shown, any number of fixed resources may be logically or directly connected to the remote server 49. Other resources are not necessarily connected to the remote server 49. Though not shown or discussed in the present example, other examples of fixed resources include an office, files, documents, e-mail addresses, databases, users, distributed components, and the like. It is also noted that one implementation includes landmarks or points of interest as resources. For example, if one wishes to map a network according to tourist attractions, then the described invention(s) could be used to do so. Anything that a user may be interested in from a location point of view could be defined as a resource to locate in a system implemented as described herein.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner will understood by those skilled in the art. The data structures where data is maintained are physical locations of the memory that have particular properties defined by the format of the data. However, while the invention is described in the foregoing context, it is not meant to be limiting as those of skill in the art will appreciate that various acts and operations described hereinafter may also be implemented in hardware.

Figure 2:
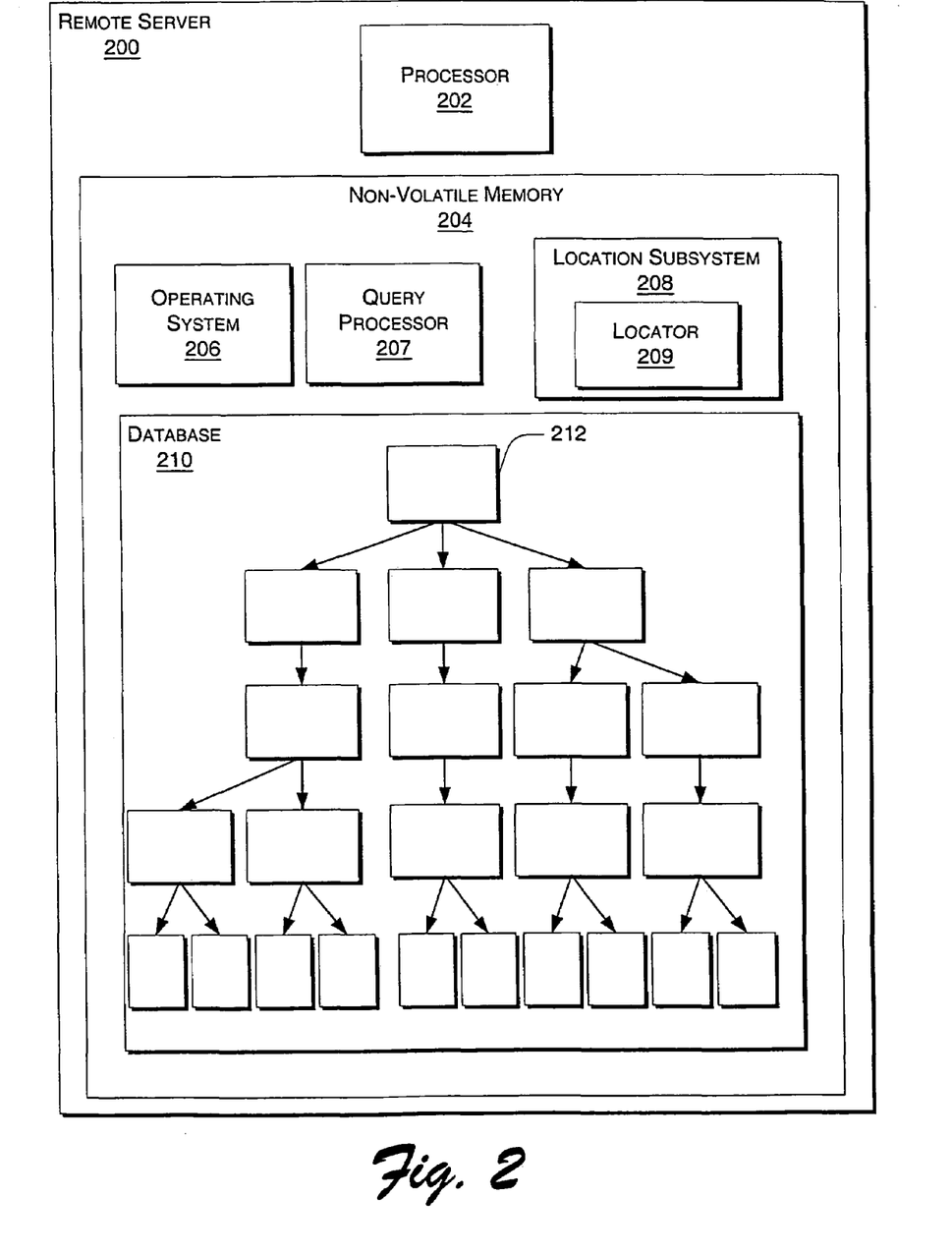
FIG. 2 is a block diagram of a remote server in a wireless network system.

FIG. 2 depicts a remote server 200 similar to the remote server 49 shown in FIG. 1, but shown in greater detail. The remote server 200 includes a processor 202 and non-volatile memory 204. Resident within the non-volatile memory 204 are an operating system 206, a query processor 207, a location subsystem 208 and a database 210. The location subsystem 208 includes a locator 209 that is used to determine the location of mobile users and resources.

It is noted that, in an alternative implementation, the locator 209 may be located on a mobile computing unit (not shown). The locator 209 on such a mobile computing unit would be used to determine the location of other mobile users, fixed users and resources. However, for discussion purposes, the locator 209 will be discussed as being a part of the location subsystem 208 on the server 200.

The database 210 contains information regarding fixed resources, such as the printer 62, scanner 64 and copier 66 shown in FIG. 1. The database 210 stores such information in a hierarchical directory structure, such as a directory tree 212 depicted in FIG. 2. The directory tree 212 may also be referred to in the art as an "organizational unit." Several organizational units may be linked together to form an extensive network. The importance of the directory tree 212 and its function will be described in greater detail below with reference to FIG. 3.

It is noted that the directory tree 212 is a logical data structure. Therefore, while reference is made to storing objects, records, files, etc. in the directory tree 212, it is understood that the directory tree 212 actually stores names of such object, records, files, etc. together with pointers to those items.

Figure 3:
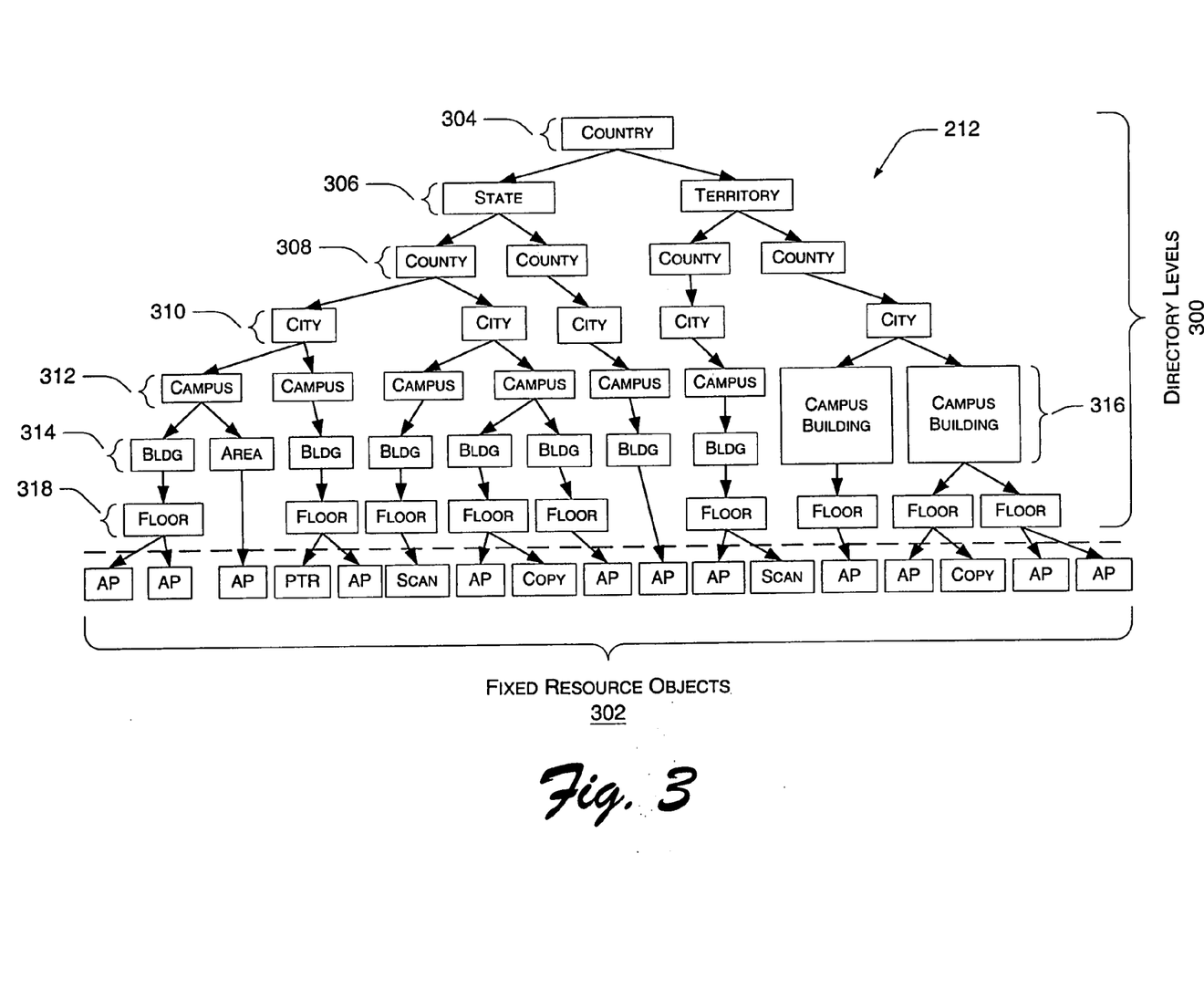
FIG. 3 is a block diagram of a hierarchical directory structure utilized in the present invention.

FIG. 3 depicts the directory tree 212 structure of the database 210 having multiple directory levels 300 and containing several fixed resource objects 302 (the examples given here include "access point" (AP), "printer" (PTR), "scanner" (SCAN) and "copier" (COPY)). Access points can be base stations of a wireless network or simply physical ports on a wired network. A fixed resource object 302 contains information regarding the fixed resource it represents, including the location of the fixed resource and its properties. The directory tree 212 is constructed in a simple and intuitive "bottom-up" method. Fixed resource objects 302 are stored in a lowest of the directory levels 300. The lowest level of the directory levels 300 represents the smallest defined geographical region, or area, in which the fixed resource is located (a "base" geographical region). Each subsequently higher level of the directory tree 212 represents an increasingly larger geographical region (an "extended" geographical region) that is covered by the wireless network system 10.

Each of the directory levels 300 comprises a class of geographical area. The class name of a top level 304 of the directory tree 212 is "country," which identifies a geographical region identified by a country's border. Although only one object is shown at this level, it is noted that any number of objects may be stored that are in the class of "country." Also, it is noted that the geographical region of "country" is an arbitrary selection, and the top level of the directory tree 212 may represent any geographical region. For example there may be a "continent" class above "country".

The class immediately subordinate to "country" includes "state" and "territory" 306. As the name implies, each object in this class represents a state or territory within the country represented in the directory level immediately superior to it. Beneath "state/territory" 306 is class "county" 308. In this class, each object represents a county within a state or territory. Subordinate to the "county" level is class "city" 310.

Two examples are given for the class(es) subordinate to the class of "county." One geographical region that might be identified at this level is "campus" 312. Beneath the class of "campus" is a class that includes "building" and "area" 314. If an organization does not have multiple campuses, then these levels may be combined into one class, designated herein as "campus building" 316. It is noted that the term "area" is used to denote spaces between buildings in a typical business campus.

The level immediately subordinate to "building" 314 or "campus building" 316 is class "floor" 318. Even though a building may have only one floor, the floor is still designated (e.g., "floor1") to comply with the structure of the directory tree 212.

Each fixed resource object 302 is stored in a floor object 318. A fixed resource object 302 is then referenced according to its place in the directory tree 212, e.g., USA/Washington/King/Redmond/Main/Bldg112/Floor1/ptr22 for a printer having the name ptr22.

The classes of country, state, territory, county, city, campus, building, and floor contain their absolute geographic location in terms of longitude, latitude and altitude. Inside the floor object, fixed resource objects 302 are stored with relative coordinates, e.g., x, y and, sometimes, z offsets from the absolute location of the floor.

When searching for a resource, the search begins at the same level in the hierarchy as the access point (base station), which receives the query from the mobile computer. So, for example, when searching for a closest printer for a mobile connected to an access point described as:

USA/Washington/King/Redmond/Main/Bldg112/Floor2/AP3, the search begins at:

USA/Washington/King/Redmond/Main/Bldg112/Floor2.

This allows for quick and accurate location of nearby resources quickly.

It is noted that the selection of the levels in the hierarchy is arbitrary and can be set to any definition desired by the user. The example given above, which includes hierarchical levels that are geographic regions is but one example. A different example is a hierarchy that includes levels based on landmarks or area descriptions. For example, an implementation may be used that includes the hierarchy of country/state/metroarea/city/area/landmark wherein the area may include "downtown" and landmark may include "federal courthouse."

Figure 4:
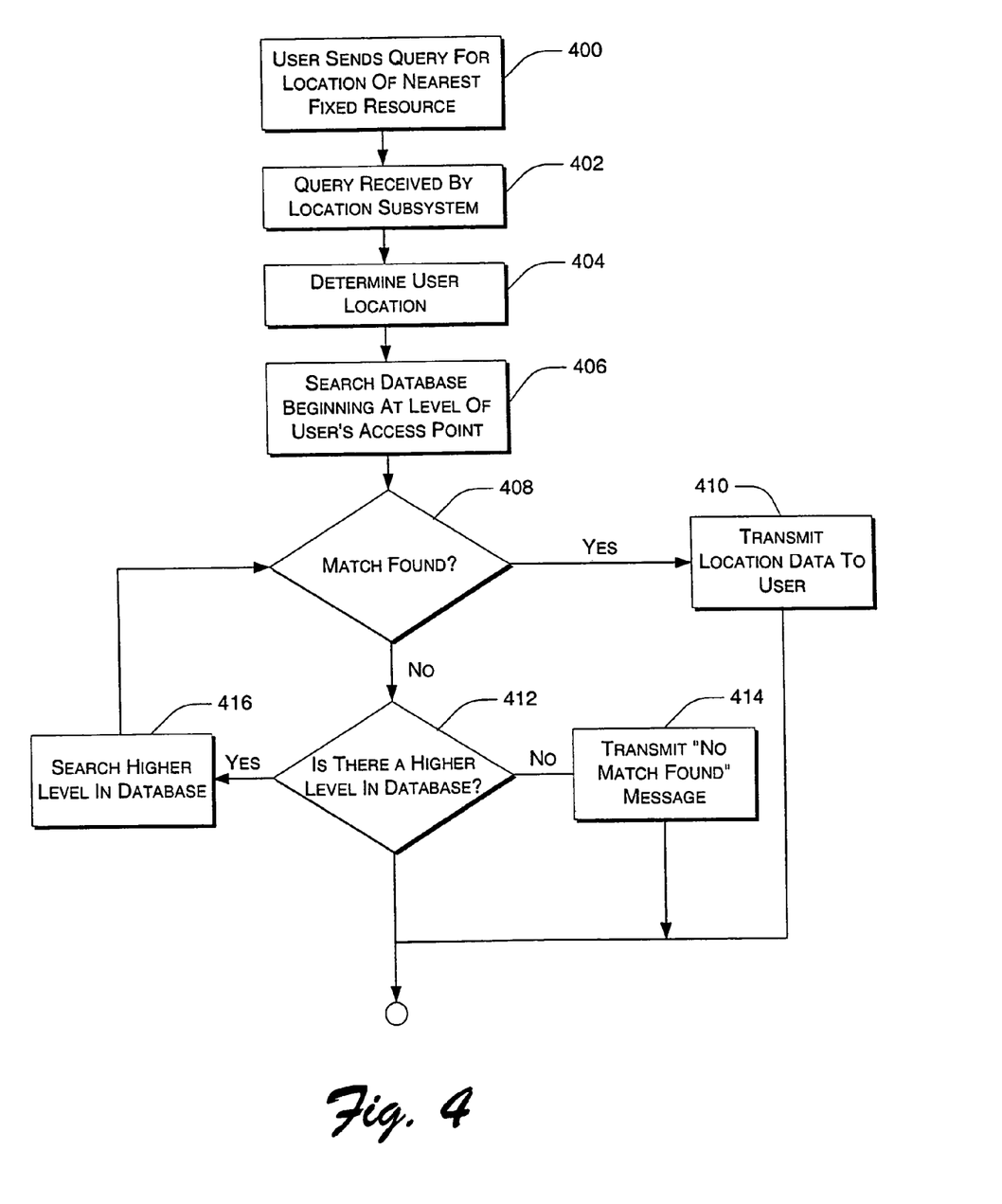
FIG. 4 is a flow diagram of a method for finding a fixed resource that is nearest to a mobile user.

FIG. 4 is a flow chart depicting a method for locating a nearest resource in a wireless network. At step 400, a mobile user sends a query requesting the location of a nearest fixed resource. The query is received by the query processor 207 (step 402), and the locator 209 of the location subsystem 208 determines the location of the mobile user and the access point to which the user is connected at step 404.

At step 406, the location subsystem 208 searches the database beginning at the level of the access point to which the user is connected. If a match is found ("Yes" branch of step 408), then location data is transmitted to the user at step 410. It is noted that the query may not simply be a request for a nearest fixed resource, such as a printer. The query may contain certain attributes or properties required by the user, such as the nearest printer that is a color printer that the user has permission to use. It is also noted that the location data may simply be the location of the requested fixed resource, or it may provide specific directions for the user to follow to get from the location of the user to the location of the requested fixed resource.

If a match is not found ("No" branch of step 408), then if there is a higher level in the directory tree 212 ("Yes" branch of step 412), the search will continue at that level at step 416. If there is not a higher level in the directory tree 212 ("No" branch of step 412), then a "No Match Found" message is transmitted to the user at step 414.

One implementation of the current invention utilizes the Active Directory™ service included in Microsoft® Windows® 2000. Active Directory™ is the foundation of Windows® 2000 distributed networks. The Active Directory™ APIs (application program interfaces) provide access to the data stored in a directory. Further references may be made to terms utilized in Active Directory™. Detailed explanation may not be provided herein as those skilled in the art are assumed to understand Active Directory™ terms.

Active Directory Service Interfaces (ADSI) is a set of COM (common object model) interfaces used to access the capabilities of directory services from different network providers in a distributed computing environment to present a single set of directory service interfaces for managing network resources. ADSI makes it easier to perform common administrative tasks, such as adding new users, managing printers, and locating resources throughout the distributed computing environment.

Services can be published in a directory and users can use the directory to find the services. Publishing a service in Active Directory™ enables users and administrators to move from a machine-centric view of the distributed system to a service-centric view.

The present invention contemplates modifying the Active Directory™ schema to include the following classes and attributes.

Structural Classes

Level 1:
    Class: locCampus
    General
        Common Name:    Location-Campus
        X.500 OID:    to be assigned
        Class Type    Structural
    Relationship
        Parent Class:    top
        Auxilary Classes:
        Possible Superior:    organizationalUnit
    Attributes
        Mandatory:
        Optional:    bldgName
Level 2:
    Class: locBuilding
    General
        Common Name:    Location-Building
        X.500 OID:    to be assigned
        Class Type    Structural
    Relationship
        Parent Class:    top
        Auxilary Classes:    absoluteLocation
        Possible Superior:    locCampus
    Attributes
        Mandatory:
        Optional:
    Class: locArea
    General
        Common Name:    Location-Area
        X.500 OID:    to be assigned
        Class Type    Structural
    Relationship
        Parent Class:    top
        Auxilary Classes:    absoluteLocation
        Possible Superior:    locCampus -continued

| | | |
|---|---|---|
| Attributes | | |
|     Mandatory: | | |
|     Optional: | CommonName | |
| Level 3: | | |
|     Class: locFloor | | |
|     General | | |
|         Common Name: | Location-Floor | |
|         X.500 OID: | to be assigned | |
|         Class Type | Structural | |
|     Relationship | | |
|         Parent Class: | top | |
|         Auxilary Classes: | absoluteLocation | |
|         Possible Superior: | locBuilding | |
|     Attributes | | |
|         Mandatory: | | |
|         Optional: | posZOffset | |
| Level 4 (Resources): | | |
|     Class: resWirelessAP | | |
|     General | | |
|         Common Name: | Resource-Wireless AP | |
|         X.500 OID: | to be assigned | |
|         Class Type | Structural | |
|     Relationship | | |
|         Parent Class: | top | |
|         Auxilary Classes: | relativeLocation | |
|         Possible Superior: | locFloor; locArea | |
|     Attributes | | |
|         Mandatory: | macAddress, IpAddress | |
|         Optional: | | |

(Similar resource classes exist for printers, scanners, copiers, fax machines, or any other network-capable device that is shared by network users.)

Auxiliary Classes

| | | |
|---|---|---|
| Class: absoluteLocation | | |
|     General | | |
|         Common Name: | Absolute-Location | |
|         X.500 OID: | to be assigned | |
|         Class Type | Auxiliary | |
|     Relationship | | |
|         Parent Class: | top | |
|         Auxilary Classes: | | |
|         Possible Superior: | | |
|     Attributes | | |
|         Mandatory: | posLongitude, posLatitude, posAltitude | |
|         Optional: | | |
| Class: relativeLocation | | |
|     General | | |
|         Common Name: | Relative-Location | |
|         X.500 OID: | to be assigned | |
|         Class Type | Auxiliary | |
|     Relationship | | |
|         Parent Class: | top | |
|         Auxilary Classes: | | |
|         Possible Superior: | | |
|     Attributes | | |
|         Mandatory: | posXOffset, posYOffset | |
|         Optional: | posZOffset | |

In a simple implementation, a printer may be represented as an object of type PrintQueue and is placed in the directory server tree as a child object of the machine that is servicing the printer. For example, if in domain redmond.microsoft.com, machine mcom3 is hosting printer laserjet, the complete path for the printer would be:

LDAP://DC=com/DC=microsoft/DC=redmond/ CN=computers/CN=mcom 3/CN=mcom3-laserjet

A more difficult, but more proper, mechanism for representing a printer within the location hierarchy is to create a PrintQueue object in the location hierarchy that shadows or references the object at its normal location within the directory server hierarchy.

CONCLUSION

The described implementations advantageously provide for an efficient way in which to store and search for location information of fixed resources in a wireless network. Other advantages will be apparent to those of skill in the art.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method for searching for a location of a nearest fixed resource in a wireless network having one or more fixed resources, the method comprising:

forming a request by a computing unit for:

a location of a nearest fixed resource to the computing unit; and         communication to a network server to:

determine a location of the computing unit;

search a hierarchical directory structure containing fixed resource objects for a match with the requested fixed resource, each fixed resource object being stored in the hierarchical directory structure according to a location of each fixed resource, wherein the fixed resource objects are stored in the hierarchical directory structure according to a relative location of the fixed resource within a base geographical region in which the fixed resource is located, the base geographical region being stored in the hierarchical directory structure according to an absolute location of the base geographical region, the base geographical region being located within one or more extended geographical regions which are stored in the hierarchical directory structure according to an absolute location of each extended geographical region; and             determine which fixed resource object has a location that is nearest to the computing unit; and     receiving data from the network server at the computing unit regarding the location of the nearest fixed resource.

2. The method as recited in claim 1, wherein the searching the hierarchical directory structure further comprises beginning at a geographical region in which the computing unit is connected, searching the geographical region and, if a matching fixed resource is not found, repeatedly searching a next-largest of the one or more of the extended geographical regions until a match is found or until all the geographical regions have been searched and no match is found.

3. The method as recited in claim 1, wherein the searching the hierarchical directory structure further comprises searching only a primary geographical region in which the computing unit is located and any secondary geographical regions that may be encompassed by the primary geographical region.

4. The method as recited in claim 1, wherein the computing unit is a mobile computing unit operating within the scope of the wireless network.

5. The method as recited in claim 1, wherein the data transmitted regarding the location of the fixed resource comprises directions from the location of the computing unit to the location of the fixed resource, the directions being displayable on the computing unit.

6. The method as recited in claim 1, wherein:
the request is a request for a location of a nearest fixed resource having certain properties;
the searching further comprises searching for a match of the requested fixed resource having the requested certain properties; and
the determining comprises determining which fixed resource object having the requested certain properties represents a fixed resource that is nearest to the computing unit.

7. One or more computer readable media comprising computer executable instructions that, when executed on a computer, direct the computer to perform the method as recited in claim 1.

8. A method comprising receiving and storing multiple records associated with fixed resources in a wireless network utilizing a directory tree structure to organize the records according to a location of the fixed resource that the record represents, wherein the directory tree structure comprises multiple levels, each level representing a geographical area covered by the wireless network, a lowest level representing a smallest geographical area in which a fixed resource may be located, and each subsequently higher level of the tree structure representing increasingly larger geographical areas which encompass the fixed resources, and wherein the fixed resource objects are stored in the hierarchical directory structure according to a relative location of the fixed resource within a base geographical region in which the fixed resource is located, the base geographical region being stored in the hierarchical directory structure according to an absolute location of the base geographical region, the base geographical region being located within one or more extended geographical regions which are stored in the hierarchical directory structure according to an absolute location of each extended geographical region.

9. The method as recited in claim 8, wherein each record representing a fixed resource further comprises properties of the fixed resource represented by the record.

10. One or more computer-readable media comprising computer executable instructions that, when executed on a computer, direct the computer to perform the method of claim 8.

11. One or more computer readable media comprising computer executable instructions that, when executed by a computer direct the computer to store fixed resource information about one or more fixed resources of a wireless network by:
naming a fixed resource object with an object name that denotes a location of a fixed resource represented by the object, the fixed resource object including properties of the fixed resource; and
storing the fixed resource object according to the object name in a hierarchical directory structure in one or more computer-readable media, the hierarchical directory structure having multiple levels, each level representing a geographical region in which the fixed resource is located wherein:
the location of the fixed resource is a location that is defined relative to an absolute location; and
the absolute location is a geographical region that is located within one or more other geographical regions, each geographical region corresponding to one level in the hierarchical directory structure, and wherein the object name associated with the fixed resource object comprises each geographical location in which the fixed resource is located and the relative location of the fixed resource.

12. One or more computer readable media as recited in claim 11, wherein the hierarchical directory structure having a lowest level and a highest level, the lowest level corresponding to a smallest geographical region covered by the wireless network, the highest level corresponding to a largest geographical region covered by the wireless network.

13. One or more computer readable media as recited in claim 11, wherein the network comprises one or more servers containing computer-readable media, and wherein the storing the object further comprises storing the object in the computer-readable media of each of the one or more servers.

14. One or more computer readable media as recited in claim 11, wherein there are multiple geographical regions that are divided into classes, each class corresponding to a level in the hierarchical directory structure, each geographical region belonging to one of the following classes: country, state, territory, county, city, campus, building, area or floor.

15. A computing device comprising:
a location subsystem to determine a location of a user within at least one geographical area;
a resource database having records that each contain information about a resource, including a location of the resource, each record being ordered according to the location of the resource represented by the record, and a directory tree structure having multiple levels, each level representing a geographical area, and wherein the fixed resource objects arc stored in the hierarchical directory structure according to a relative location of the fixed resource within a base geographical region in which the fixed resource is located, the base geographical region being stored in the hierarchical directory structure according to an absolute location of the base geographical region, the base geographical region being located within one or more extended geographical regions which are stored in the hierarchical directory structure according to an absolute location of each extended geographical region; and
a query processor that receives a query from the user for a resource that is nearest to the user and returns a location of a resource that is nearest to the user.

16. The computing device as recited in claim 15, wherein the query processor receives the location of the user and determines which resource is nearest to the user by searching the resource database beginning with the geographical area in which the user is connected to the network and, if a resource is not found, searching at least one other geographical area for a resource matching the query.

17. The computing device as recited in claim 15, wherein the location of the resource is a relative location stored with coordinates that are relative to a geographical area which is defined in absolute coordinates.

18. The computing device as recited in claim 15, wherein:
the information about a resource further includes properties of the resource; and
the query processor is further configured to receive a query from the user for a resource that is nearest to the user and that has at least one particular property, and to return a location of a resource that is nearest to the user and has the particular property requested by the user.

19. A computing device comprising:
a processor; and
memory configured to maintain one or more modules that are executable on the processor to search for a location of a nearest fixed resource in a wireless network having one or more fixed resources by forming a request for:
a location of a nearest fixed resource by a computing unit; and
communication to a network server over a network to:
    determine a location of the computing unit;
    search a hierarchical directory structure containing fixed resource objects for a match with the requested fixed resource, each fixed resource object being stored in the hierarchical directory structure according to a location of each fixed resource, and wherein the fixed resource objects are stored in the hierarchical directory structure according to a relative location of the fixed resource within a base geographical region in which the fixed resource is located, the base geographical region being stored in the hierarchical directory structure according to an absolute location of the base geographical region, the base geographical region being located within one or more extended geographical regions which are stored in the hierarchical directory structure according to an absolute location of each extended geographical region; and
    determine which fixed resource object has a location that is nearest to the computing unit; and
receipt of data from the network sewer at the computing unit in response to the request regarding the location of the nearest fixed resource.

20. The computing device as recited in claim 19, wherein the searching the hierarchical directory structure further comprises beginning at a geographical region in which the computing unit is connected, searching the geographical region and, if a matching fixed resource is not found, repeatedly searching a next-largest of the one or more of the extended geographical regions until a match is found or until all the geographical regions have been searched and no match is found.

21. The computing device as recited in claim 19, wherein the searching the hierarchical directory structure further comprises searching only a primary geographical region in which the computing unit is located and any secondary geographical regions that may be encompassed by the primary geographical region.

22. The computing device as recited in claim 19, wherein the network is a wireless network.

23. The computing device as recited in claim 19, wherein the data transmitted regarding the location of the fixed resource comprises directions from the location of the computing unit to the location of the fixed resource, the directions being displayable on the computing unit.

24. The computing device as recited in claim 19, wherein:
the request is a request for a location of a nearest fixed resource having certain properties;
the searching further comprises searching for a match of the requested fixed resource having the requested certain properties; and
the determining comprises determining which fixed resource object having the requested certain properties represents a fixed resource that is nearest to the computing unit.

25. A system comprising:
means for forming a request by a computing unit for:
    a location of a nearest fixed resource to the computing unit; and
    communication to a network server to:
        determine a location of the computing unit;
        search a hierarchical directory structure containing fixed resource objects for a match with the requested fixed resource, each fixed resource object being stored in the hierarchical directory structure according to a location of each fixed resource, and wherein the fixed resource objects are stored in the hierarchical directory structure according to a relative location of the fixed resource within a base geographical region in which the fixed resource is located, the base geographical region being stored in the hierarchical directory structure according to an absolute location of the base geographical region, the base geographical region being located within one or more extended geographical regions which are stored in the hierarchical directory structure according to an absolute location of each extended geographical region; and
        determine which fixed resource object has a location that is nearest to the computing unit; and
means for receiving data from the network server at the computing unit regarding the location of the nearest fixed resource.

26. A system comprising:
means for receiving a request from a computing unit for a location of a nearest fixed resource to the computing unit;
means for determining a location of the computing unit;
means for searching a hierarchical directory structure containing fixed resource objects for a match with the requested fixed resource, each fixed resource object being stored in the hierarchical directory structure according to a location of each fixed resource, and wherein the fixed resource objects are stored in the hierarchical directory structure according to a relative location of the fixed resource within a base geographical region in which the fixed resource is located, the base geographical region being stored in the hierarchical directory structure according to an absolute location of the base geographical region, the base geographical region being located within one or more extended geographical regions which are stored in the hierarchical directory structure according to an absolute location of each extended a heal region;
means for determining which fixed resource object has a location that is nearest to the computing unit; and
means for communicating data to the computing unit regarding the location of the nearest fixed resource.

* * * * *